United States Patent [19]
Orfield

[11] Patent Number: 6,068,257
[45] Date of Patent: May 30, 2000

[54] TELEVISION VIDEO GAME STORAGE SYSTEM

[76] Inventor: Loyd E. Orfield, 637 W. Cucharras St., Colorado Springs, Colo. 80905

[21] Appl. No.: 09/276,111

[22] Filed: Mar. 25, 1999

Related U.S. Application Data

[63] Continuation-in-part of application No. 08/828,059, Mar. 28, 1997, abandoned.

[51] Int. Cl.$^7$ ..................................................... A63F 9/22
[52] U.S. Cl. .................... 273/148 B; 312/9.1; 312/223.1
[58] Field of Search ............................... 273/148 B, 309; 312/9.1, 223.1, 223.2, 223.3

[56] References Cited

U.S. PATENT DOCUMENTS

| | | | |
|---|---|---|---|
| 4,394,055 | 7/1983 | Smith | 273/148 B X |
| 5,011,149 | 4/1991 | Purnell | 273/148 B |
| 5,168,969 | 12/1992 | Mayhew | 273/148 B X |
| 5,209,478 | 5/1993 | Simpson | 273/148 B |
| 5,324,036 | 6/1994 | Morrow | 273/309 X |
| 5,489,010 | 2/1996 | Rogers | 273/148 B |

*Primary Examiner*—Raleigh W. Chiu

[57] ABSTRACT

A television video game unit storage system for holding a television video game unit, control pad input devices, and game cartridges in an organized manner. The television video game unit storage system includes a bottom panel with a front wall, first and second side walls and a pair of middle walls upwardly extending therefrom. The middle walls define therebetween an open top and open back main compartment designed for receiving a television video game unit therein. The second side wall and the second middle wall define therebetween a cartridge compartment designed for receiving a plurality of game cartridges for a television video game therein. The first side wall and the first middle wall define therebetween a side compartment with an upwardly extending open front upper housing designed for receiving therein control pad input devices for a television video game unit.

11 Claims, 7 Drawing Sheets

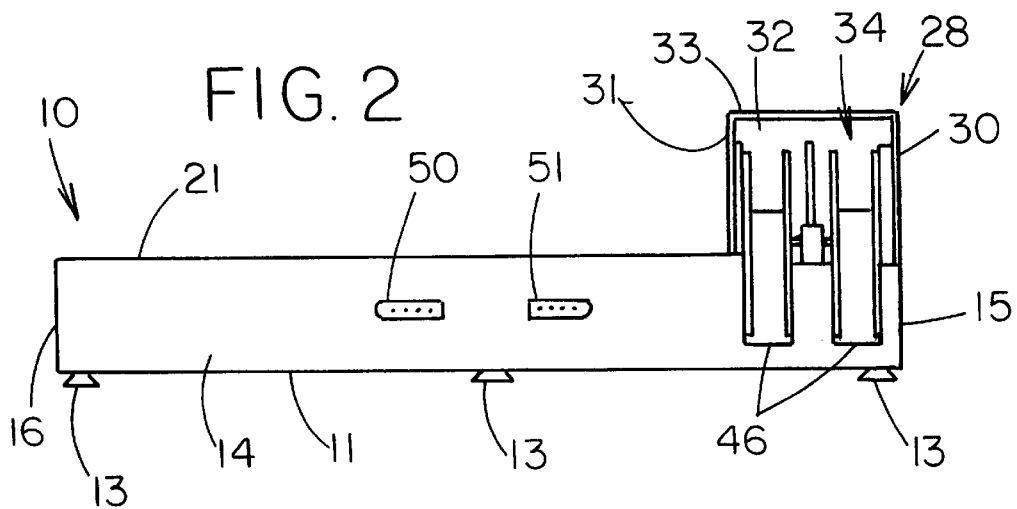
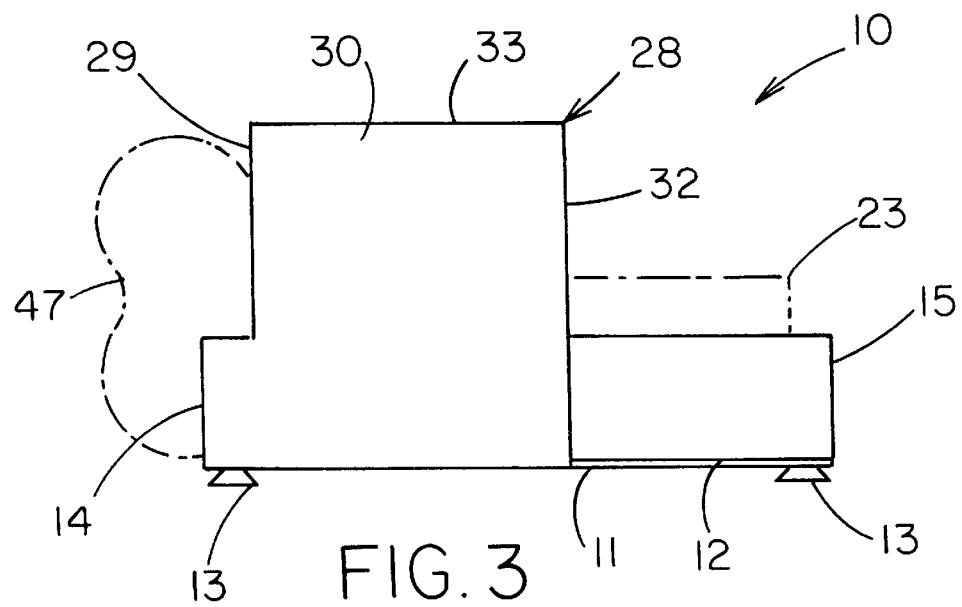

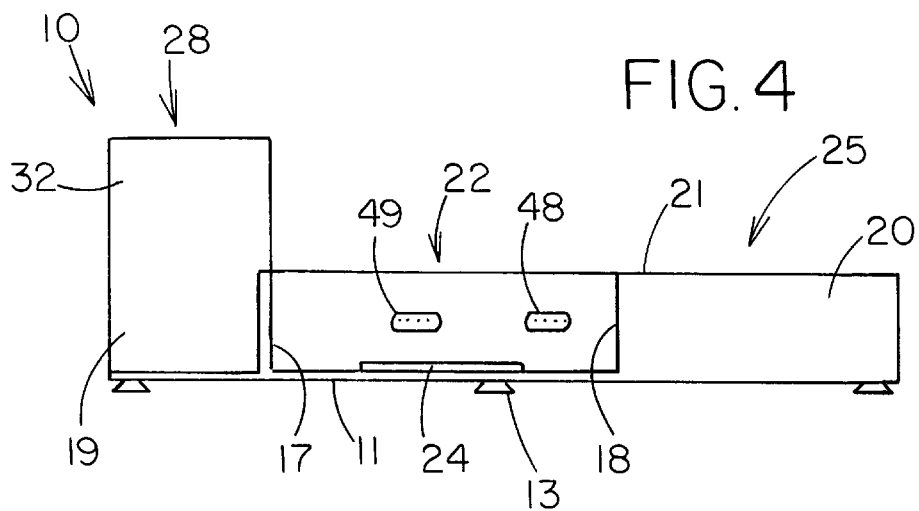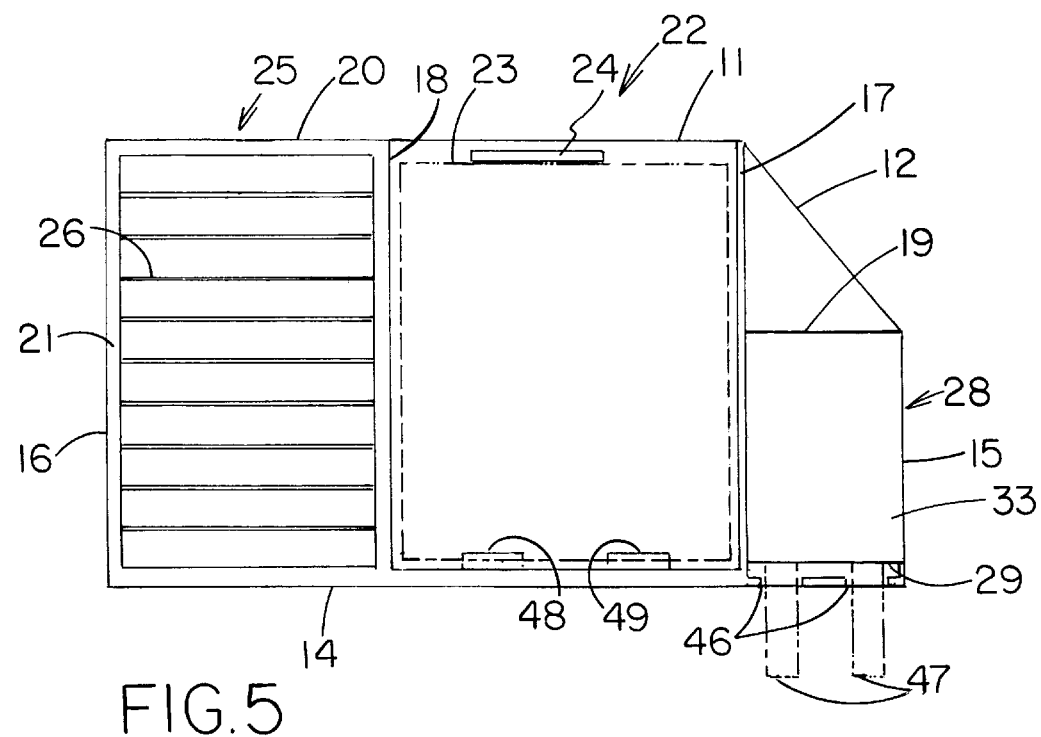

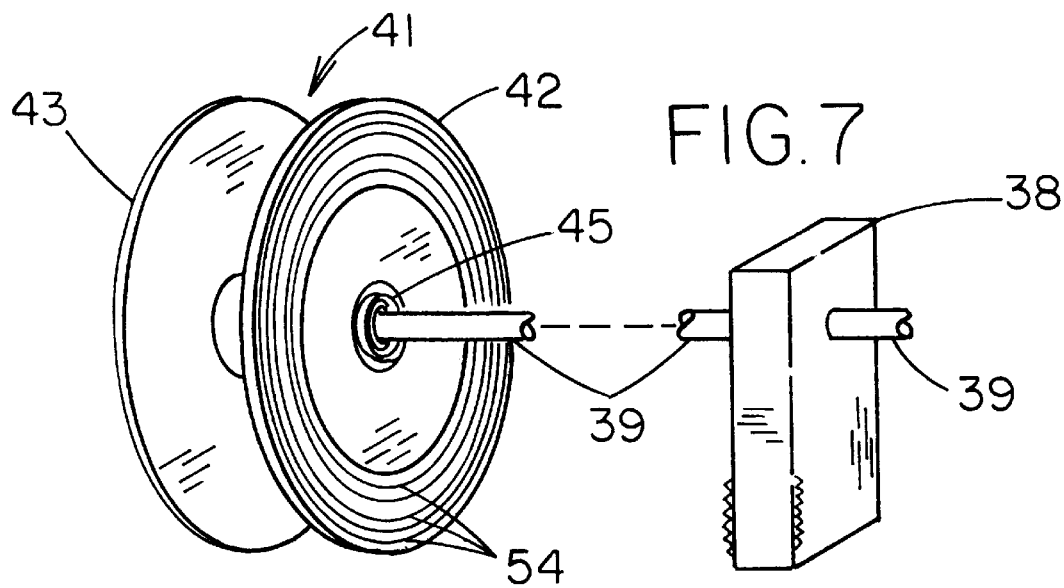
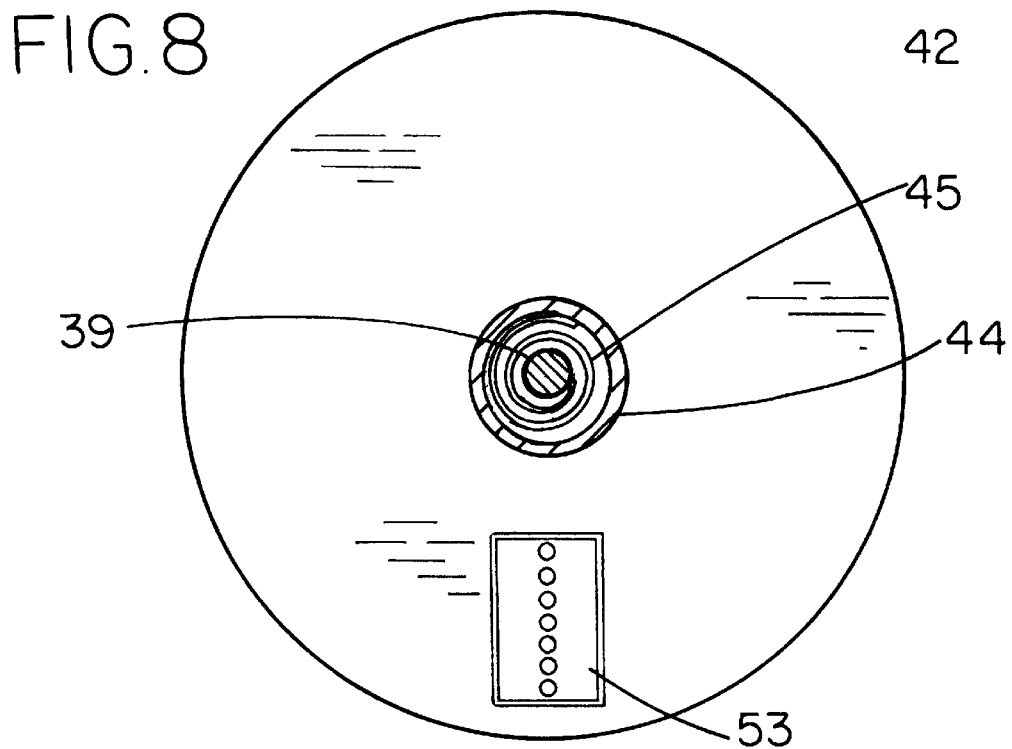

TELEVISION VIDEO GAME STORAGE SYSTEM

CROSS-REFERENCE TO RELATED APPLICATIONS

This is a continuation in part of U.S. patent Application Ser. No. 08/828,059 filed Mar. 28, 1997 now abandoned.

BACKGROUND OF THE INVENTION

1. Field of the Invention

The present invention relates to television video game unit storage systems and more particularly pertains to a new television video game unit storage system for holding a television video game unit, control pad input devices, and game cartridges in an organized manner.

2. Description of the Prior Art

The use of television video game unit storage systems is known in the prior art. More specifically, television video game unit storage systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,394,055 by Smith; U.S. Pat. No. 4,411,481 by Berkman; U.S. Pat. Des. 266,208 by Cannon et al.; U.S. Pat. Des. No. 326,777 by Newby, Sr.; U.S. Pat. No. 4,453,785 by Smith; and U.S. Pat. No. 4,117,931 by Berkman which are all incorporated by reference herein.

Other known prior art includes U.S. Pat. No. 5,011,149 by Purnell; U.S. Pat. No. 5,168,969 by Mayhew; U.S. Pat. No. 5,209,478 by Simpson; U.S. Pat. No. 5,324,036 by Morrow; and U.S. Pat. No. 5,489,010 by Rogers.

While these devices fulfill their respective, particular objectives and requirements, the aforementioned patents do not disclose a new television video game unit storage system. The inventive device includes a bottom panel with a front wall, first and second side walls and a pair of middle walls upwardly extending therefrom. The middle walls define therebetween an open top and open back main compartment designed for receiving a television video game unit therein. The second side wall and the second middle wall define therebetween a cartridge compartment designed for receiving a plurality of game cartridges for a television video game therein. The first side wall and the first middle wall define therebetween a side compartment with an upwardly extending open front upper housing designed for receiving therein control pad input devices for a television video game unit.

In these respects, the television video game unit storage system according to the present invention substantially departs from the conventional concepts and designs of the prior art, and in so doing provides an apparatus primarily developed for the purpose of holding a television video game unit, control pad input devices, and game cartridges in an organized manner.

SUMMARY OF THE INVENTION

In view of the foregoing disadvantages inherent in the known types of television video game unit storage systems now present in the prior art, the present invention provides a new television video game unit storage system construction wherein the same can be utilized for holding a television video game unit, control pad input devices, and game cartridges in an organized manner.

The general purpose of the present invention, which will be described subsequently in greater detail, is to provide a new television video game unit storage system apparatus and method which has many of the advantages of the television video game unit storage systems mentioned heretofore and many novel features that result in a new television video game unit storage system which is not anticipated, rendered obvious, suggested, or even implied by any of the prior art television video game unit storage systems, either alone or in any combination thereof.

To attain this, the present invention generally comprises a bottom panel with a front wall, first and second side walls and a pair of middle walls upwardly extending therefrom. The middle walls define therebetween an open top and open back main compartment designed for receiving a television video game unit therein. The second side wall and the second middle wall define therebetween a cartridge compartment designed for receiving a plurality of game cartridges for a television video game therein. The first side wall and the first middle wall define therebetween a side compartment with an upwardly extending open front upper housing designed for receiving therein control pad input devices for a television video game unit.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new television video game unit storage system apparatus and method which has many of the advantages of the television video game unit storage systems mentioned heretofore and many novel features that result in a new television video game unit storage system which is not anticipated, rendered obvious, suggested, or even implied by any of the prior art television video game unit storage systems, either alone or in any combination thereof.

It is another object of the present invention to provide a new television video game unit storage system which may be easily and efficiently manufactured and marketed.

It is a further object of the present invention to provide a new television video game unit storage system which is of a durable and reliable construction.

An even further object of the present invention is to provide a new television video game unit storage system which is susceptible of a low cost of manufacture with regard to both materials and labor, and which accordingly is then susceptible of low prices of sale to the consuming public, thereby making such television video game unit storage system economically available to the buying public.

Still yet another object of the present invention is to provide a new television video game unit storage system which provides in the apparatuses and methods of the prior art some of the advantages thereof, while simultaneously overcoming some of the disadvantages normally associated therewith.

Still another object of the present invention is to provide a new television video game unit storage system for holding a television video game unit, control pad input devices, and game cartridges in an organized manner.

Yet another object of the present invention is to provide a new television video game unit storage system which includes a bottom panel with a front wall, first and second side walls and a pair of middle walls upwardly extending therefrom. The middle walls define therebetween an open top and open back main compartment designed for receiving a television video game unit therein. The second side wall and the second middle wall define therebetween a cartridge compartment designed for receiving a plurality of game cartridges for a television video game therein. The first side wall and the first middle wall define therebetween a side compartment with an upwardly extending open front upper housing designed for receiving therein control pad input devices for a television video game unit.

Still yet another object of the present invention is to provide a new television video game unit storage system that has a pair of recoiling spools for gathering up the electrical cords of the video game control pad input devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic front view of the present invention.

FIG. 3 is a schematic first side view of the present invention.

FIG. 4 is a schematic back view of the present invention.

FIG. 5 is a schematic top view of the present invention.

FIG. 7 is a schematic exploded perspective view of a spool and middle member of the spool assembly;

FIG. 8 is a schematic cross sectional view of a spool of the spool assembly facing the inner disk of the spool.

DESCRIPTION OF THE PREFERRED EMBODIMENT

Figure 1:
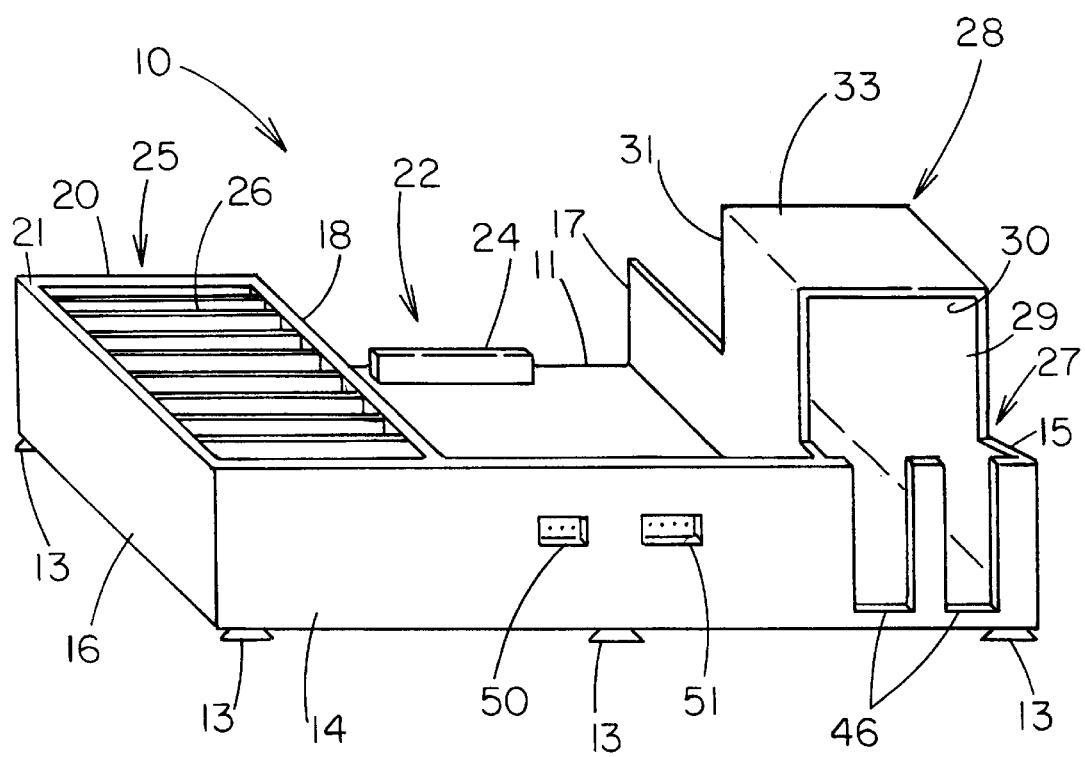
FIG. 1 is a schematic perspective view of a new television video game unit storage system with the spool assembly removed from the side compartment and upper housing according to the present invention.

With reference now to the drawings, and in particular to FIGS. 1 through 10 thereof, a new television video game unit storage system embodying the principles and concepts of the present invention and generally designated by the reference numeral 10 will be described.

As best illustrated in FIGS. 1 through 10, the television video game unit storage system 10 generally comprises a bottom panel with a front wall, first and second side walls and a pair of middle walls upwardly extending therefrom. The middle walls define therebetween an open top and open back main compartment designed for receiving a television video game unit therein. The second side wall and the second middle wall define therebetween a cartridge compartment designed for receiving a plurality of game cartridges for a television video game therein. The first side wall and the first middle wall define therebetween a side compartment with an upwardly extending open front upper housing designed for receiving therein control pad input devices for a television video game unit.

In closer detail, the television video game unit storage system 10 comprises a generally rectangular substantially planar bottom panel 11 having an outer perimeter comprising substantially parallel front and back edges, a pair of substantially parallel side edges extending substantially perpendicularly between the front and back edges of the bottom panel, and an oblique corner 12 formed between the back edge and a first of the side edges of the bottom panel. A plurality of suction cups 13 are coupled to a bottom face of the bottom panel and designed for suctionally coupling the bottom panel to a surface to ensure that the bottom panel is held in place on the surface.

A front wall 14 upwardly extends substantially perpendicularly from the bottom panel along the front edge of the bottom panel between the side edges of the bottom panel. A first side wall 15 upwardly extends substantially perpendicularly from the bottom panel along the first side edge of the bottom panel between the front edge and the oblique corner of the bottom panel. A second side wall 16 upwardly extends substantially perpendicularly from the bottom panel along a second of the side edges of the bottom panel between the front edge and back edge of the bottom panel.

A spaced apart pair of middle walls 17, 18 are upwardly extended substantially perpendicularly from the bottom panel between the front edge and back edge of the bottom panel. The middle walls are interposed between the first and second side walls. A first of the middle walls is positioned towards the first side wall and a second of the middle walls is positioned toward the second side wall. The side walls and the middle walls are preferably extended substantially parallel to one another and substantially perpendicular to the front wall.

A first back wall 19 is upwardly extended substantially perpendicularly from the bottom panel between the first side wall and the first middle wall. The first back wall is extended substantially perpendicular to the first side wall and the first middle wall. A second back wall 20 is upwardly extended substantially perpendicularly from the bottom panel along the back edge of the bottom panel between the second side wall and the second middle wall. The second back wall is also extended substantially parallel to the first back wall and substantially perpendicular to the second side wall and the second middle wall.

Preferably, the front wall, the side walls, the middle walls, and the back walls have substantially coplanar upper edges 21 lying in a plane substantially parallel to the bottom panel.

The middle walls define therebetween a generally rectangular open top and open back main compartment 22 extending between the front wall and the back edge of the bottom panel. In use, the main compartment is designed for receiving a television video game unit 23 (or processor) therein as illustrated in FIG. 5 in broken lines. The bottom panel preferably has an elongate stop 24 upwardly extending into the main compartment adjacent the back edge of the bottom panel. The stop is extended substantially parallel to the back edge of the bottom panel. In use, the stop is designed for helping prevent a television video game unit in the main compartment from sliding out of the open back of the main compartment.

The second side wall and the second middle wall define therebetween a generally rectangular cartridge compartment 25 extending between the front wall and the second back wall. The cartridge compartment is designed for receiving a plurality of game cartridges for a television video game therein. The cartridge compartment has therein a plurality of substantially parallel and spaced apart dividing walls 26 extending between the second side wall and the second middle wall. The dividing walls are extended substantially parallel to the front wall and the second back wall and substantially perpendicular to the second side wall and the second middle wall. The dividing walls are preferably spaced apart a generally equal intervals between the front wall and the second back wall. The dividing walls divide the cartridge compartment into a plurality of cartridge spaces each designed for receiving a game cartridge of a television video game therein such that a portion of each game cartridge disposed therein upwardly extends above the plane defined by the upper edges of the front wall, the side walls, the middle walls and the back walls.

The first side wall and the first middle wall define therebetween a side compartment 27 extending between the front wall and the first back wall. The side compartment has an upper housing 28 upwardly extending therefrom to cover a rear portion of the side compartment. The upper housing has an open front 29, a first side panel 30 upwardly extending from the first wall, a second side panel upwardly extending from the first middle wall 31, a back panel 32 upwardly extending from the first back wall, and a top panel 33 extending between the side panels and between the back panel and the open front of the upper housing.

The open front of the upper housing lies in a plane substantially parallel with and spaced apart from the front wall. The first side panel and the first side wall are preferably coplanar with one another. Similarly, the second side panel and the first middle wall are also coplanar with one another and the back panel and the first back wall are coplanar with one another. In this preferred embodiment, the top panel and the bottom panel lie in substantially parallel planes with one another.

A spool assembly 34 is disposed in the upper housing and the rear portion of the side compartment. The spool assembly has a base 35, a spaced apart pair of side members 36, 37 upwardly extending from the base, and a middle member 38 upwardly extending from the base between the side members of the spool assembly. A first of the side members and the middle member of the spool assembly define a first spool space therebetween while a second of the side members and the middle member of the spool assembly define a second spool space therebetween.

The spool assembly has an axle 39 extending between first and second spool spaces. The spool assembly also has a first spool 40 rotatably mounted about the axle in the first spool space between the first side member and the middle member and the spool assembly has a second spool 41 rotatably mounted about the axle in the second spool space between the second side member and the middle member. Each of the spools comprises a spaced apart pair of disks 42, 43 and a central hub 44 connecting the disks of the respective spool together. An inner disk 42 of the pair of disks of each of the spools faces towards the middle member and an outer disk 43 of the pair of disks of each of the spools faces towards an adjacent side member of the spool assembly.

Each of the spools is biased preferably by a spring 45 disposed in the central hub about the axle to rotate in a first direction about the axle. In use, the spools each are designed for wrapping therearound an elongate flexible cable of a control pad input device for a television video game unit such that rotation of the spools in the first direction wraps the flexible cable of the respective control pad input device about the central hub of the respective spool.

The front wall has a pair of generally rectangular cutouts 46 therethrough into the side compartment. Each of the cutouts is designed for receiving a portion of an associated control pad input device 47 having its flexible cable wrapped around one of the spools as best illustrated in FIGS. 3 and 5.

Preferably, the front wall has a pair of plugs 48, 49 extending into the main compartment. The plugs of the front wall are designed for insertion into corresponding sockets in a television video game unit disposed in the main compartment to electrically connect the plugs to the television video game unit. The front wall also preferably has a pair of forwardly facing sockets 50, 51 therein which are each electrically connected to an associated plug of the front wall. In use, each of the sockets of the front wall is designed for receiving therein a plug of a control pad input device for a television video game to electrically connect the control pad input device to the associated plug of the front wall and thereby to the television video game unit as well.

Figure 6:
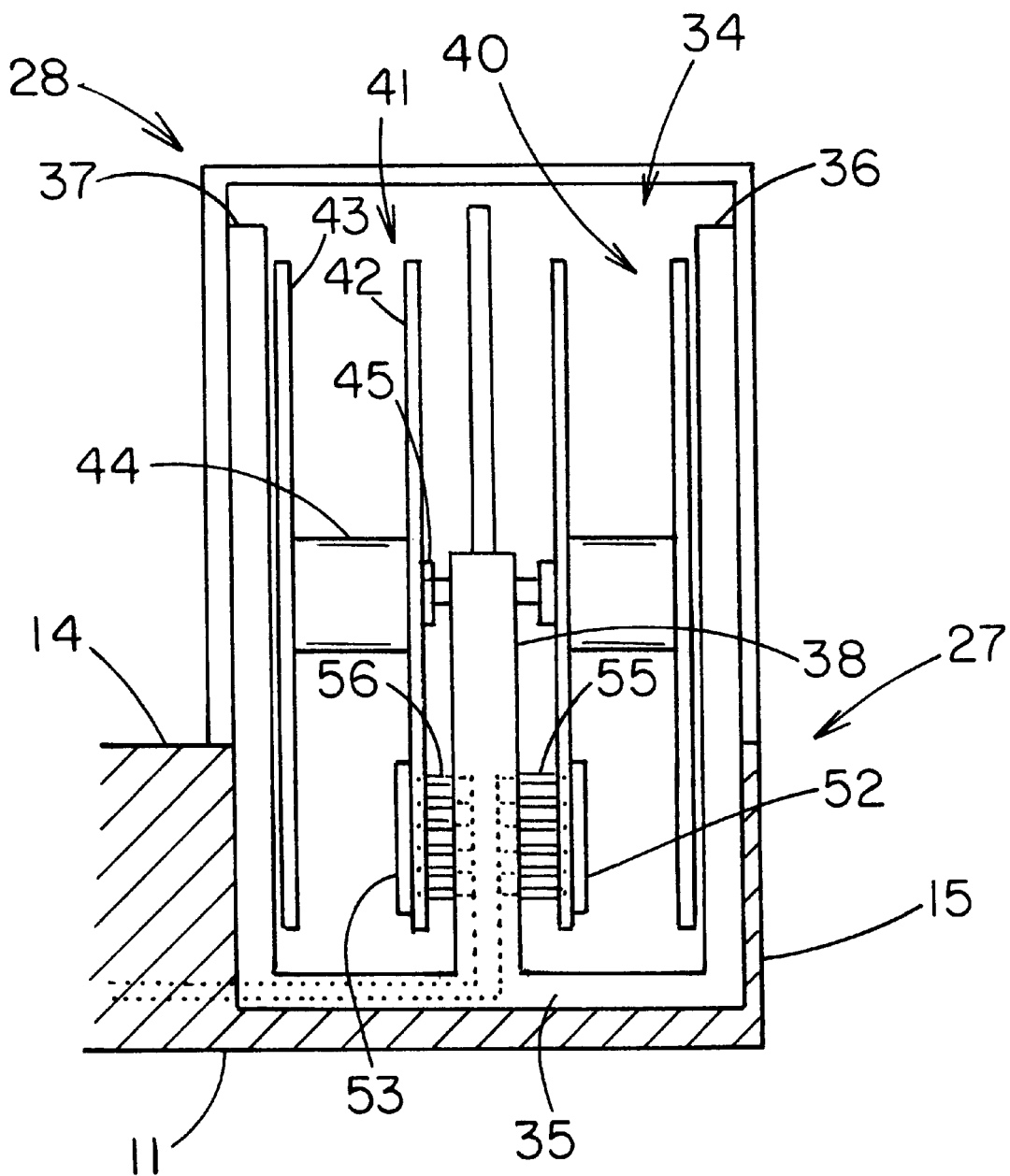
FIG. 6 is a schematic cross sectional view of the side compartment with the spool assembly therein.
Figure 9:
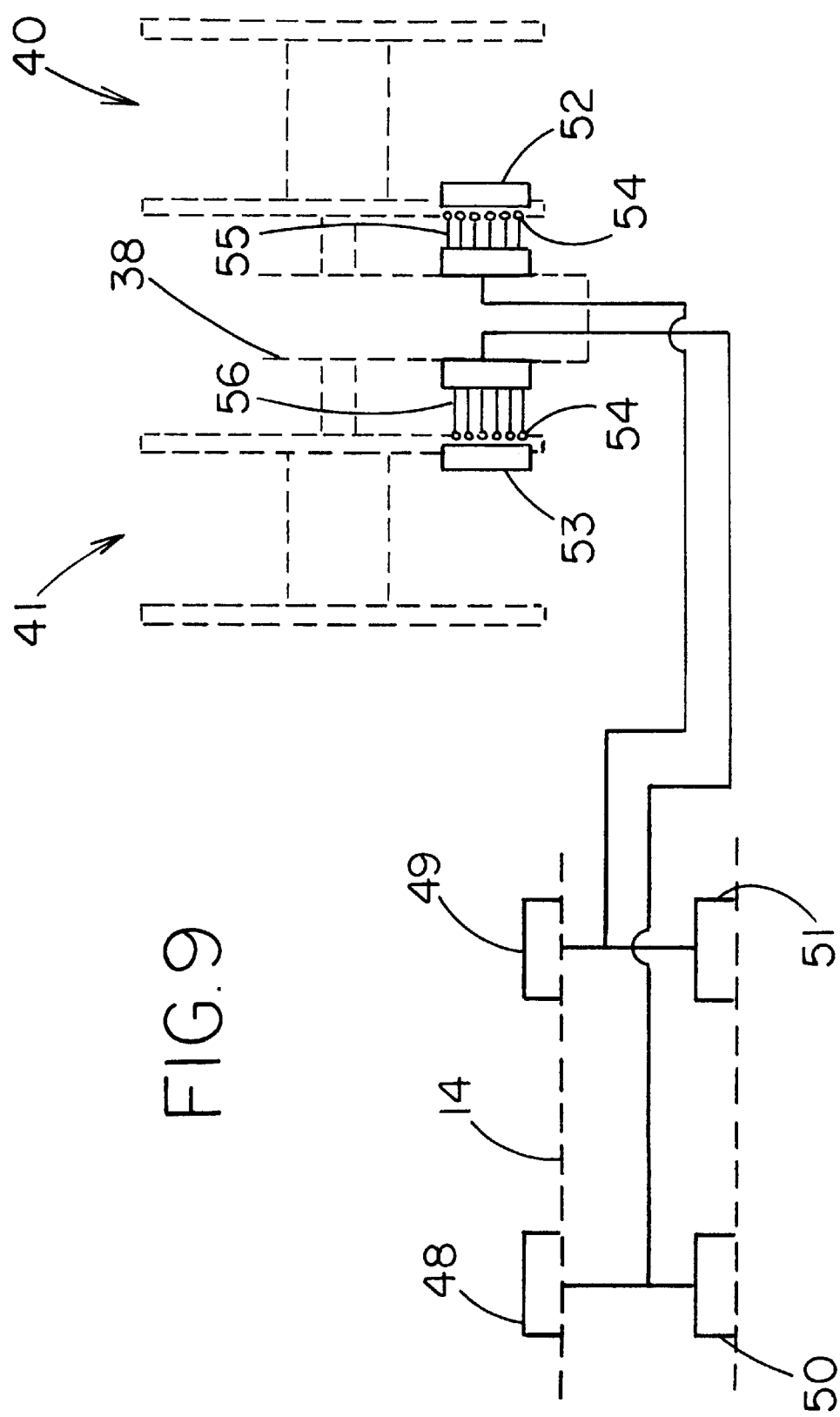
FIG. 9 is an electrical schematic of the present invention.

With particular reference to FIGS. 6 and 8, the inner disk of each of the spools has a socket 52, 53 facing towards the outer disk of the respective spool. Each of the sockets of the spools is designed for receiving therein a plug at an end of the flexible cable of the control pad input device wrapped around the central hub of the respective spool to electrically connect the control pad input device to the socket of respective spool.

As illustrated in FIG. 8, the inner disk of each of the spools has a plurality of concentric annular contacts 54 facing the middle member of the spool assembly which are electrically connected to the socket of the respective spool.

The middle member of the spool assembly has a first and second sets of brush contacts 55, 56. The first set of brush contacts is extended into the first spool space and the second set of brush contacts is extended into the second spool space. Each set of brush contacts is abutted against the annular contacts of the associated spool disposed in the respective spool space such that each set of brush contacts are electrically connected to the annular contacts of the associated spool. The first set of brush contacts is electrically connected one of the plugs of the front wall and the first second of brush contacts is electrically connected the other of the plugs of the front wall to thereby electrically connect the control pad input devices wrapped around the spools to the television video game unit in the main compartment.

Figure 10:
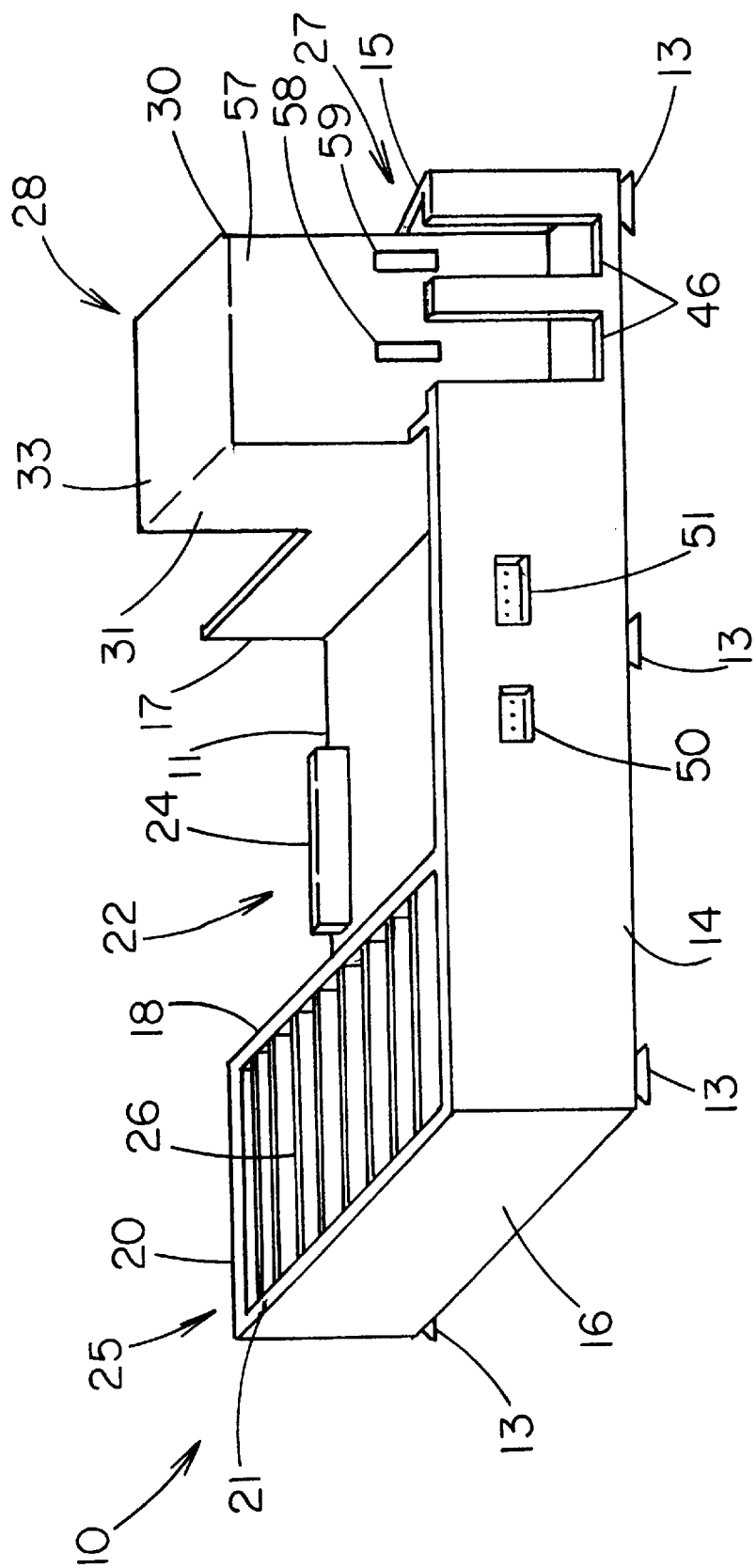
FIG. 10 is a schematic perspective view of an embodiment of the television video game unit storage system with a front plate covering the open front of upper housing.

In one preferred embodiment, as shown in FIG. 10, a front plate 57 may be attached (and preferably detachably attached) to the upper housing to cover the open front of the upper housing. In this preferred embodiment, the front plate has a pair of openings 58, 59 therethrough to permit extension of the flexible conduits of the control pad input device therethrough.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A television video game unit storage system, comprising:
   a bottom panel;
   a front wall upwardly extending from said bottom panel;
   a first side wall upwardly from said bottom panel;
   a second side wall upwardly extending from said bottom panel;
   a spaced apart pair of middle walls being upwardly extended from said bottom panel
   a first back wall being upwardly extended from said bottom panel between said first side wall and said first middle wall;
   a second back wall being upwardly extended from said bottom panel between said second side wall and said second middle wall;
   said middle walls defining therebetween an open top and open back main compartment extending between said front wall and said back edge of said bottom panel;
   said main compartment being adapted for receiving a television video game unit therein;
   said second side wall and said second middle wall defining therebetween a cartridge compartment extending between said front wall and said second back wall, said cartridge compartment being adapted for receiving a plurality of game cartridges for a television video game therein;
   said first side, wall add said first middle wall defining therebetween a side compartment extending between said front wall and said first brick wall;
   said side compartment having an open front upper housing upwardly extending therefrom to cover a rear portion of said side compartment; and
   said side compartment being adapted for receiving therein control pad input devices for a television video game unit.

2. The television video game unit storage system of claim 1, wherein said bottom panel has an oblique corner formed between a back edge of said bottom panel and a side edge of said bottom panel located adjacent said first side wall, said first side wall being extended from a front edge of said bottom panel to said oblique corner of said bottom panel.

3. The television video game unit storage system of claim 1, further comprising a plurality of suction cups being coupled to said bottom panel and adapted for suctionally coupling said bottom panel to a surface.

4. The television video game unit storage system of claim 1, wherein said bottom panel has an elongate stop upwardly extending into said main compartment adjacent said open back of said main compartment, said stop being adapted for helping prevent a television video game unit in said main compartment from sliding out of said open back of said main compartment.

5. The television video game unit storage system of claim 1, wherein said cartridge compartment has a plurality of spaced apart dividing walls therein extending between said second side wall and said second middle wall, said dividing walls dividing said cartridge compartment into a plurality of cartridge spaces each adapted for receiving a game cartridge of a television video game therein.

6. The television video game unit storage system of claim 1, wherein said front wall has a pair of cutouts therethrough into said side compartment, wherein each of said cutouts are adapted for receiving a portion of an associated control pad input device.

7. The television video game unit storage system of claim 1, further comprising a spool assembly being disposed in said upper housing and said rear portion of said side compartment, said spool assembly having a base, a spaced apart pair of side members upwardly extending from said base, and a middle member upwardly extending from said base between said side members of said spool assembly, a first of said side members and said middle member of said spool assembly defining a first spool space therebetween, a second of said side members and said middle member of said spool assembly defining a second spool space therebetween, said spool assembly having an axle extending between first and second spool spaces, said spool assembly having a first spool rotatably mounted to said axle in said first spool space to said first side member and said middle member, said spool assembly having a second spool rotatably mounted to said axle in said second spool space to said second side member and said middle member, each of said spools comprising a spaced apart pair of disks and a central hub connecting said disks of the respective spool together, an inner disk of said pair of disks of each of said spools facing towards said middle member, an outer disk of said pair of disks of each of said spools facing towards an adjacent side member of said spool assembly, each of said spools being biased to rotate in a first direction about said axle, and wherein said spools each are designed for wrapping therearound an elongate flexible cable of a control pad input device for a television video game unit such that rotation of said spools in said first direction wraps the flexible cable of the respective control pad input device about said central hub of the respective spool.

8. The television video game unit storage system of claim 7, wherein said front wall has a pair of plugs extending into said main compartment, said plugs of said front wall being adapted for insertion into corresponding sockets in a television video game unit disposed in said main compartment to electrically connect said plugs to said television video game unit.

9. The television video game unit storage system of claim 8, wherein said front wall has a pair of forwardly facing sockets therein, each of said sockets being electrically connected to an associated plug of said front wall, each of said sockets of said front wall being adapted for receiving therein a plug of a control pad input device for a television video game to electrically connect the control pad input device to the associated plug of said front wall.

10. The television video game unit storage system of claim 8, wherein said inner disk of each of said spools has a socket facing towards the outer disk of the respective spool, each of said sockets of said spools being adapted for receiving therein a plug at an end of the flexible cable of the control pad input device wrapped around the central hub of the respective spool to electrically connect the control pad input device to the socket of respective spool, said inner disk of each of said spools having a plurality of concentric annular contacts facing said middle member of said spool assembly, said annular contacts of each spool being electrically connected to said socket of the respective spool, said middle member of said spool assembly having a first and second sets of brush contacts, said first set of brush contacts being extended into said first spool space and said second set of brush contacts being extended into said second spool space, each set of brush contacts being abutted against said annular contacts of the associated spool disposed in the respective spool space such that each set of brush contacts are electrically connected to said annular contacts of the associated spool, said first set of brush contacts being electrically connected one of said plugs of said front wall and said first second of brush contacts being electrically connected the other of said plugs of said front wall.

11. A television video game unit storage system, comprising:
   a generally rectangular substantially planar bottom panel having an outer perimeter comprising substantially parallel front and back edges, a pair of substantially parallel side edges extending substantially perpendicularly between said front and back edges of said bottom panel, and an oblique corner formed between said back edge and a first of said side edges of said bottom panel;
   a plurality of suction cups being coupled to said bottom panel and adapted for suctionally coupling said bottom panel to a surface;
   a front wall upwardly extending substantially perpendicularly from said bottom panel along said front edge of said bottom panel between said side edges of said bottom panel;
   a first side wall upwardly extending substantially perpendicularly from said bottom panel along said first side edge of said bottom panel between said front edge and said oblique corner of said bottom panel;
   a second side wall upwardly extending substantially perpendicularly from said bottom panel along a second of said side edges of said bottom panel between said front edge and back edge of said bottom panel;
   a spaced apart pair of middle walls being upwardly extended substantially perpendicularly from said bottom panel between said front edge and back edge of said bottom panel, said middle walls being interposed between said first and second side walls, a first of said middle walls being positioned towards said first side wall and a second of said middle walls being positioned toward said second side wall;
   said side walls and said middle walls being extended substantially parallel to one another and substantially perpendicular to said front wall;
   a first back wall being upwardly extended substantially perpendicularly from said bottom panel between said first side wall and said first middle wall, said first back wall being extended substantially perpendicular to said first side wall and said first middle wall;
   a second back wall being upwardly extended substantially perpendicularly from said bottom panel along said back edge of said bottom panel between said second side wall and said second middle wall, said second back wall being extended substantially parallel to said first back wall and substantially perpendicular to said second side wall and said second middle wall;
   said front wall, said side walls, said middle walls, and said back walls having substantially coplanar upper edges lying in a plane substantially parallel to said bottom panel;
   said middle walls defining therebetween a generally rectangular open top and open back main compartment extending between said front wall and said back edge of said bottom panel;
   said main compartment being adapted for receiving a television video game unit therein;
   said bottom panel having an elongate stop upwardly extending into said main compartment adjacent said back edge of said bottom panel, said stop being extended substantially parallel to said back edge of said bottom panel;
   said stop being adapted for helping prevent a television video game unit in said main compartment from sliding out of said open back of said main compartment;
   said second side wall and said second middle wall defining therebetween a generally rectangular cartridge compartment extending between said front wall and said second back wall, said cartridge compartment being adapted for receiving a plurality of game cartridges for a television video game therein;
   said cartridge compartment having therein a plurality of substantially parallel and spaced apart dividing walls extending between said second side wall and said second middle wall;
   said dividing walls being extended substantially parallel to said front wall and said second back wall and substantially perpendicular to said second side wall and said second middle wall;
   said dividing walls being spaced apart a generally equal intervals between said front wall and said second back wall;
   said dividing walls dividing said cartridge compartment into a plurality of cartridge spaces each adapted for receiving a game cartridge of a television video game therein;
   said first side wall and said first middle wall defining therebetween a side compartment extending between said front wall and said first back wall;

said side compartment having an upper housing upwardly extending therefrom to cover a rear portion of said side compartment;

said upper housing having an open front, a first side panel upwardly extending from said first wall, a second side panel upwardly extending from said first middle wall, a back panel upwardly extending from said first back wall, and a top panel extending between said side panels and between said back panel and said open front of said upper housing;

said first side panel and said first side wall being coplanar with one another, said second side panel and said first middle wall being coplanar with one another, said back panel and said first back wall being coplanar with one another, said top panel and said bottom panel lying in substantially parallel planes with one another;

said open front of said upper housing lying in a plane substantially parallel with and spaced apart from said front wall;

said front wall having a pair of generally rectangular cutouts therethrough into said side compartment;

a spool assembly being disposed in said upper housing and said rear portion of said side compartment;

said spool assembly having a base, a spaced apart pair of side members upwardly extending from said base, and a middle member upwardly extending from said base between said side members of said spool assembly;

a first of said side members and said middle member of said spool assembly defining a first spool space therebetween, a second of said side members and said middle member of said spool assembly defining a second spool space therebetween;

said spool assembly having an axle extending between first and second spool spaces;

said spool assembly having a first spool rotatably mounted to said axle in said first spool space to said first side member and said middle member;

said spool assembly having a second spool rotatably mounted to said axle in said second spool space to said second side member and said middle member;

each of said spools comprising a spaced apart pair of disks and a central hub connecting said disks of the respective spool together;

an inner disk of said pair of disks of each of said spools facing towards said middle member, an outer disk of said pair of disks of each of said spools facing towards an adjacent side member of said spool assembly;

each of said spools being biased to rotate in a first direction about said axle;

said spools each being adapted for wrapping therearound an elongate flexible cable of a control pad input device for a television video game unit such that rotation of said spools in said first direction wraps the flexible cable of the respective control pad input device about said central hub of the respective spool;

each of said cutouts being adapted for receiving a portion of an associated control pad input device;

said front wall having a pair of plugs extending into said main compartment, said plugs of said front wall being adapted for insertion into corresponding sockets in a television video game unit disposed in said main compartment to electrically connect said plugs to said television video game unit;

said front wall having a pair of forwardly facing sockets therein, each of said sockets being electrically connected to an associated plug of said front wall, each of said sockets of said front wall being adapted for receiving therein a plug of a control pad input device for a television video game to electrically connect the control pad input device to the associated plug of said front wall;

said inner disk of each of said spools having a sockets facing towards the outer disk of the respective spool, each of said sockets of said spools being adapted for receiving therein a plug at an end of the flexible cable of the control pad input device wrapped around the central hub of the respective spool to electrically connect the control pad input device to the socket of respective spool;

said inner disk of each of said spools having a plurality of concentric annular contacts facing said middle member of said spool assembly, said annular contacts of each spool being electrically connected to said socket of the respective spool;

said middle member of said spool assembly having a first and second sets of brush contacts, said first set of brush contacts being extended into said first spool space and said second set of brush contacts being extended into said second spool space;

each set of brush contacts being abutted against said annular contacts of the associated spool disposed in the respective spool space such that each set of brush contacts are electrically connected to said annular contacts of the associated spool; and said first set of brush contacts being electrically connected one of said plugs of said front wall and said first second of brush contacts being electrically connected the other of said plugs of said front wall.

* * * * *